(12) United States Patent
Medsker et al.

(10) Patent No.: US 6,251,998 B1
(45) Date of Patent: Jun. 26, 2001

(54) HYDROSILYLATION CROSSLINKING OF THERMOPLASTIC ELASTOMER

(75) Inventors: Robert E. Medsker, Hartville; Donald R. Hazelton, Hudson; Gary W. Gilbertson, Wadsworth; Sabet Abdou-Sabet; Kuo-Shein Shen, both of Akron, all of OH (US); Ronald L. Hazelton; Periagaram S. Ravishankar, both of Kingwood, TX (US)

(73) Assignees: Advanced Elastomer Systems, L.P.; Exxon Chemical Patents, Inc.

( * ) Notice: Subject to any disclaimer, the term of this patent is extended or adjusted under 35 U.S.C. 154(b) by 0 days.

(21) Appl. No.: 09/367,484

(22) PCT Filed: Feb. 25, 1998

(86) PCT No.: PCT/US98/03645

§ 371 Date: Oct. 29, 1999

§ 102(e) Date: Oct. 29, 1999

(87) PCT Pub. No.: WO98/38226

PCT Pub. Date: Sep. 3, 1998

Related U.S. Application Data

(60) Provisional application No. 60/039,433, filed on Feb. 26, 1997.

(51) Int. Cl.$^7$ .............................. C08F 8/00; C08L 47/00; C08L 83/05

(52) U.S. Cl. .................... 525/192; 525/194; 525/195; 525/210; 525/232; 525/240; 525/241

(58) Field of Search .................................... 525/192, 194, 525/195, 210, 232, 240, 241

(56) References Cited

U.S. PATENT DOCUMENTS

| | | | |
|---|---|---|---|
| 5,672,660 | * | 9/1997 | Medsker et al. ............... 525/101 |
| 5,936,028 | * | 8/1999 | Medsker et al. ............... 524/506 |

* cited by examiner

*Primary Examiner*—Nathan M. Nutter
(74) *Attorney, Agent, or Firm*—William A. Skinner

(57) ABSTRACT

In the preparation of thermoplastic elastomers by hydrosilylation crosslinking of the elastomeric component, the use of an elastomer containing a non-conjugated diene and having a Mooney viscosity within the MST range of 45 to 100 provides products with a high level of crosslinking and an improved combination of physical properties. This improvement is obtained even at low concentrations of hydrosilylation catalyst.

15 Claims, No Drawings

HYDROSILYLATION CROSSLINKING OF THERMOPLASTIC ELASTOMER

This application is based on provisional application U.S. Ser. No. 60/039,433, filed Feb. 26, 1997.

BACKGROUND OF THE INVENTION

1. Field of the Invention

This invention relates to thermoplastic elastomer compositions prepared using hydrosilylation crosslinking of the elastomer component of the composition. A thermoplastic elastomer is generally defined as a polymer or blend of polymers that can be processed and recycled in the same way as a conventional thermoplastic material, yet has properties and functional performance similar to that of vulcanized rubber at service temperatures. Blends or alloys of plastic and elastomeric rubber have become increasingly important in the production of high performance thermoplastic elastomers, particularly for the replacement of thermoset rubbers in various applications. High performance thermoplastic elastomers in which a highly vulcanized rubbery polymer is intimately dispersed in a thermoplastic matrix are generally known as thermoplastic vulcanizates.

2. Description of the Related Art

Polymer blends which have a combination of both thermoplastic and elastic properties are generally obtained by combining a thermoplastic resin with an elastomeric composition in a way such that the elastomer component is intimately and uniformly dispersed as a discrete particulate phase within a continuous phase of the thermoplastic. Early work with vulcanized rubber components is found in U.S. Pat. No. 3,037,954 which discloses both static vulcanization of the rubber, as well as the technique of dynamic vulcanization wherein a vulcanizable elastomer is dispersed into a molten resinous thermoplastic polymer and the elastomer is cured while continuously mixing and shearing the blend. The resulting composition is a micro-gel dispersion of cured elastomer in an uncured matrix of thermoplastic polymer.

In U.S. Pat. No. 32,028 polymer blends comprising an olefin thermoplastic resin and an olefin copolymer are described, wherein the rubber is dynamically vulcanized to a state of partial cure. The resulting compositions are reprocessible. U.S. Pat. Nos. 4,130,534 and 4,130,535 further disclose thermoplastic vulcanizates comprising butyl rubber and polyolefin resin, and olefin rubber and polyolefin resin, respectively. The compositions are prepared by dynamic vulcanization and the rubber component is cured to the extent that it is essentially insoluble in conventional solvents. A range of crosslinking, or curing, agents for the vulcanization of the rubber are described in the early art, including peroxides, sulfurs, phenolic resins, radiation, and the like.

U.S. Pat. No. 4,803,244 generally discusses the use of multifunctional organosilicon compounds in conjunction with a catalyst as an agent for crosslinking the rubber component of a thermoplastic elastomer by hydrosilylation. Hydrosilylation involves the addition of a silicon hydride across a multiple bond, often with a transition metal catalyst. This patent describes a rhodium catalyzed hydrosilylation of EPDM rubber in a blend with polypropylene to produce thermoplastic elastomers having a gel content of up to 34% (after correction for the plastic phase). This degree of vulcanization was achieved only with a high level of catalyst.

A further discussion of hydrosilylation crosslinking of the rubber in a thermoplastic elastomer composition is found in U.S. Pat. No. 5,672,660. The platinum catalyzed hydrosilylation of EPDM rubber containing 5-vinyl-2-norbornene as a diene monomer is described.

SUMMARY OF THE INVENTION

The present invention is based on the discovery that the process for hydrosilylation crosslinking of the rubber is a thermoplastic elastomer can be improved by employing as the rubber an ethylene, α-olefin, non-conjugated diene elastomeric polymer containing vinyl norbornene as a diene component. More particularly, it has been discovered that when the Mooney viscosity, ethylene content and diene content of this rubber are within defined ranges, unexpectedly low concentrations of hydrosilylation agent and catalyst will fully crosslink the rubber in the dynamic vulcanization process and provide a thermoplastic elastomer product with excellent physical properties and oil resistance. Additionally the ethylene, α-olefin, non-conjugated diene elastomeric polymer of the invention on which the blends with thermoplastic resins are based will generally have lower levels of diene to achieve similar or improved properties, when compared to blends made from previously available ethylene, α-olefin, non-conjugated diene elastomeric polymers. The previously available elastomers contained a diene selected from 5-ethylidene-2-norbornene, 1.4-hexadiene, dicyclopentadiene, or combinations thereof and compounds derived from them. The combination of lower diene content and lower catalyst required lead to even better properties for heat aging, UV stability and colorability.

The compositions produced by the improved process have utility as replacements for thermoset rubber compounds in a variety of applications, particularly where molding or extrusion is involved and the combination of thermoplastic and elastomeric properties provides an advantage. Typical uses include molded articles for automobile underhood parts, engineering and construction materials, mechanical rubber goods, industrial parts such as hose, tubing and gaskets, electrical applications and household goods.

DESCRIPTION OF THE PREFERRED EMBODIMENTS

Thermoplastic elastomer compositions may generally be prepared by blending a thermoplastic resin and a rubber, then melting the thermoplastic component and mixing the melt until the blend is homogeneous. If a composition of vulcanized rubber in a thermoplastic matrix is desired, crosslinking agents (also referred to as curatives or vulcanizing agents) are added to the blend and crosslinking occurs during the mixing under conditions of heat and shear. This latter process is described as dynamic vulcanization.

Thermoplastic Resins

A wide range of thermoplastic resins and/or their mixtures have been used in the preparation of thermoplastic elastomers, including polypropylene, polypropylene copolymers, HDPE, LDPE, VLDPE, LLDPE, polyethylene copolymers, cyclic olefin homopolymers or copolymers as well as olefinic block copolymers, polystyrene, polyphenylene sulfide, polyphenylene oxide and ethylene propylene copolymer (EP) thermoplastics.

Thermoplastic resins useful in the compositions produced by the invention include crystalline and semi-crystalline polyolefin homopolymers and copolymers. They are desirably prepared from monoolefin monomers having 2 to 20 carbon atoms, such as ethylene, propylene, 1-butene, 1-pentene and the like, as well as copolymers derived from linear and cyclic olefins, with propylene being preferred. As used in the specification and claims the term polypropylene includes homopolymers of propylene as well as reactor copolymers of polypropylene which can contain about 1 to about 20 wt % of ethylene or an α-olefin comonomer of 4 to 20 carbon atoms, and mixtures thereof. The polypropylene can be atactic, isotactic or syndiotactic, made with Ziegler-Natta or metallocene catalysts. Commercially available polyolefins may be used in the practice of the invention. Other thermoplastic resins which are substantially inert to the rubber, the silicon hydride and the hydrosilylation catalyst would also be suitable. Blends of thermoplastic resins may also be used.

The amount of thermoplastic resin found to provide useful compositions is generally from about 5 to about 90 weight percent, based on the weight of the rubber and resin. Preferably, the thermoplastic resin content will range from about 20 to about 80 percent by weight of the total polymer.

Rubber

In the present invention an ethylene, α-olefin, non-conjugated diene elastomeric polymer containing vinyl norbornene as a diene component is used as the rubber component. It contains from about 40 to about 85 weight percent ethylene, preferably about 45 to about 80 weight percent, and more preferably in the range of from about 50 to about 75 weight percent. The rubber component contains in the range of from about 0.25 to about 5 weight percent of diene, preferably from about 0.25 to about 2 weight percent and more preferably in the range of from about 0.5 to about 1.2 weight percent. The balance of the ethylene, α-olefin, non-conjugated diene elastomeric polymer will generally be made up of an α-olefin selected from propylene, 1-butene, 1-hexene, 4-methyl-1-pentene, 1-octene, 1-decene and combinations thereof and the like. The preferred α-olefin is propylene, The elastomeric polymer has a Mooney viscosity, measured without oil in the polymer using ASTM D1646 with a small thin rotor (Mooney small thin-MST), generally in the $MST_{(5-4)}$. 200° C. range of from about 45 to about 100, preferably in the range of from about 50 to about 90 and most preferably in the range of about 50 to about 85. MST values above 100 are also contemplated as long as the polymer remains substantially gel free. The polymer will have a branching index (BI) generally in the range of from about 0.1 to about 1.0, preferably in the range of from about 0.3 to about 1.0, and more preferably in the range of from a about 0.5 to about 1.0. The elastomeric polymer will have a MwGPC, LALLS/MnGPC,DRI below about 20, preferably below about 10 and more preferably below about 8.

In preparing the compositions of the invention, the amount of rubber generally ranges from about 95 to about 10 weight percent, based on the weight of the rubber and thermoplastic resin. Preferably, the rubber content will be in the range of from about 80 to about 20 weight percent of total polymer.

Method of Producing Rubber

The Ziegler polymerization of the double bond in vinyl norbornene is believed to produce a highly branched ethylene, α-olefin, vinyl norbornene elastomeric polymer. This method of branching permits the production of such elastomeric polymers substantially free of gel which would normally be associated with cationically branched ethylene, α-olefin, non-conjugated diene elastomeric polymer containing, for instance, a non-conjugated diene selected from the group consisting of 5-ethylidene-2-norbornene (ENB), 1,4-hexadiene and the like. The synthesis of substantially gel free ethylene, α-olefin, vinyl norbornene elastomeric polymers is discussed in Japanese laid open patent applications JP 151758 and JP 210169, which are incorporated by reference herein for purposes of U.S. patent practice. Preferred embodiments of the aforementioned documents to synthesize polymers suitable for this invention are described below.

The catalysts used are $VCl_4$ (vanadium tetrachloride) and $VOCl_5$ (vanadium oxytrichloride) with the latter as the preferred catalyst. The co-catalyst is chosen from (i) ethyl aluminum sesqui chloride (SESQUI), (ii) diethyl aluminum chloride (DEAC) and (iii) a 4/1 molar mixture of diethyl aluminum chloride to triethyl aluminum TEAL). SESQUI is the preferred co-catalyst. The polymerization is carried out in a continuous stirred tank reactor at 20–65° C. at a residence time of 6–15 minutes at a pressure of 7 $kg/cm^2$. The molar concentration of vanadium to alkyl is from 1 to 4 to 1 to 10. About 0.3 to 1.5 kg of polymer is produced per gram of catalyst fed to the reactor. The polymer concentration in the hexane solvent is in the range of 3–7% by weight. Other catalysts and co-catalysts may be used, some of which are disclosed in U.S. Pat. No. 5,153,282.

Metallocene catalysis of the above monomers is also contemplated. This catalyst system includes Group IV transition metal compounds and compounds capable of activating these compounds to an active catalyst state. Suitable activators include the ionizing noncoordinating anion precursor and alumoxane activating compounds, both well known and described in the field of metallocene catalysis.

Additionally, an active, ionic catalyst composition comprising a cation of a Group IV transition metal compound and a noncoordinating anion result upon reaction of the Group IV transition metal compound with the ionizing noncoordinating anion precursor. The activation reaction is suitable whether the anion precursor ionizes the metallocene, typically by abstraction of $R_1$ or $R_2$, by any methods inclusive of protonation, ammonium or carbonium salt ionization, metal cation ionization or Lewis acid ionization. The critical feature of this activation is cationization of the Group IV transition metal compound and its ionic stabilization by a resulting compatible, noncoordinating, or weakly coordinating (included in the term noncoordinating) anion capable of displacement by the copolymerizable monomers. See, for example, EP-A 0 277 003, EP-A 0 277 004, U.S. Pat. No. 5,198,401, U.S. Pat. No. 5,241,025, U.S. Pat. No. 5,387,568, WO 91/09882, WO 92/00333, WO 93/11172, and WO 94/03506 which address the use of noncoordinating anion precursors with Group IV transition metal catalyst compounds, their use in polymerization processes and means of supporting them to prepare heterogeneous catalysts. Activation by alumoxane compounds, typically alkyl alumoxanes, is less well defined as to its mechanism but is nevertheless well known for use with Group IV transition metal compound catalysts, see for example U.S. Pat. No. 5,096,867. Each of these documents is incorporated by this reference for purposes of U.S. patent practice.

Polymers prepared by these methods had the following molecular characteristics:

The inherent viscosity measured in decalin at 135° C. was in the range of 2–6 dl/g. The molecular weight distribution ($M_{w,LALLS}/M_{n,GPC\ DRI}$) was >4. The branching index was in the range 0.3–0.7.

Branching in ethylene, α-olefin, diene monomer polymers is quantified using a branching index factor. Calculating this factor requires a series of three laboratory measurements of polymer properties in solution. These are: (i) weight average molecular weight measured using low angle light scattering (LALLS) technique: (ii) weight average molecular weight and inherent viscosity using a differential refractive index detector (DRI); and (iii) inherent viscosity (IV) measured in decalin at 135° C. The first two measurements are obtained in a GPC using a filtered dilute solution of the polymer in trichlorobenzene.

An average branching index is defined as:

$$BI=(M_{v,br}/M_{w,LALLS})(M_{w,DRI}/M_{v,DRI}) \quad (1)$$

where $M_{v,br}=k(IV)^{1/a}$; and "a" is the Mark-Houwink constant (=0.759 for ethylene, α-olefin, diene monomer in decalin at 135° C.).

From equation (1) it follows that the branching index for a linear polymer is 1.0, and for branched polymers the extent of branching is defined relative to the linear polymer. Since at a constant $M_n$, $(Mw)_{branch} > (Mw)_{linear}$, BI for a branched polymer is less than 1.0, and a smaller BI value denotes a higher level of branching. The choice of catalyst will influence the MWD, with more highly branched polymers produced by $VCl_4$.

The synthesis of ethylene, α-olefin, vinyl norbornene polymers was conducted both in a laboratory pilot unit (output of about 4 Kg/day), a large scale semi works unit (output about 1 T/day) and at a plant scale of about 300 T/day.

Hydrosilylation Agents

Hydrosilylation has been disclosed as a crosslinking method. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethylsiloxane copolymers, methylhydrogen alkyl methyl polysiloxanes, bis(dimethylsilyl)alkanes and bis(dimethylsilyl)benzene.

The amount of silicon hydride compound useful in the process of the present invention can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer.

Hydrosilylation Catalysts

It has previously been understood that any catalyst, or catalyst precursor capable of generating a catalyst in situ, which will catalyze the hydrosilylation reaction with the carbon-carbon bonds of the rubber can be used. Such catalysts have included transition metals of Group VIII such as palladium, rhodium, platinum and the like, including complexes of these metals. Chlororplatinic acid has been disclosed as a useful catalyst in U.S. Pat. No. 4,803,244 and U.S. Pat. No. 5,597,867, which further disclose that the catalyst may be used at concentrations of 5 to 10,000 parts per million be weight and 100 to 200,000 parts per million be weight based on the weight of rubber, respectively.

It has been found in the process of the present invention that significantly lower concentrations of platinum-containing catalyst can be used, while obtaining improvement in both the speed of the reaction and the efficiency of the crosslinking. Concentrations of catalyst in the range of about 0.01 to about 20 parts per million be weight, expressed at platinum metal, are effective in rapidly and completely curing the rubber in the process of dynamically vulcanizing blends of thermoplastic resin and rubber. Catalyst concentrations of about 0.1 to about 4 parts per million by weight based on the weight of rubber, expressed as platinum metal, are particularly preferred.

Platinum-containing catalysts which are useful in the process of the invention are described, for example, in U.S. Pat. No. 4,578,497; U.S. Pat. No. 3,220,972; and U.S. Pat. No. 2,823,218 all of which are incorporated herein by this reference. These catalysts include chloroplatinic acid, chloroplatinic acid hexahydrate, complexes of chloroplatinic acid with sym-divinyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred, as described in U.S. Pat. No. 3,775,452; U.S. Pat. No. 3,814,730; and U.S. Pat. No. 4,288,345 all of which are incorporated herein by this reference.

Additives

The thermoplastic elastomer may contain conventional additives, which can be introduced into the composition in the thermoplastic resin, the rubber, or in the blend either before, during or after the hydrosilylation and curing. Examples of such additives are antioxidants, processing aids, reinforcing and nonreinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 0.1 to about 300 percent by weight based on the weight of the final thermoplastic elastomer product. Fillers and extenders which can be utilized include conventional inorganics such as calcium carbonate, clays, silica, talc, titanium dioxide, carbon black and the like. Additives, fillers or other compounds which may interfere with the hydrosilylation should be added after curing reaches the desired level.

Extender Oil

The rubber processing or extender oils used in thermoplastic elastomers generally are paraffinic, naphthenic or aromatic oils derived from petroleum fractions. The type will be that ordinarily used in conjunction with the specific rubber or rubbers present in the composition, and the quantity based on the total rubber content of the thermoplastic elastomer may range from zero to several hundred parts per hundred rubber. Important to the efficiency of the catalyst is that the oils and other additives contain no or very low concentrations of compounds that are catalyst inhibitors or that interfere with the activity of the catalyst. These compounds include phosphines, amines, sulfides, thiols or other compounds that may be classified as Lewis bases. Lewis bases, or other compounds that have a pair of electrons available for donation, will react with the platinum catalyst, effectively neutralizing its activity. It has been discovered that the presence of such compounds has a surprisingly detrimental impact on hydrosilylation curing in the process of dynamic vulcanization of the rubber component of the thermoplastic elastomer compositions. If the concentration of compounds which have the chemical reactivity of Lewis bases, such as compounds containing sulfur or nitrogen, is maintained at or below a level which provides less than about 1000 ppm and 300 ppm of sulfur and nitrogen respectively, then the amount of platinum catalyst required to promote efficient hydrosilylation curing in dynamic vulcanization can be substantially reduced, usually to the range of about 4 ppm or less, without impact on the cure state of the rubber or the tensile properties of the thermoplastic elastomer product. Concentrations of sulfur and nitrogen below about 500 and 200 ppm respectively are more preferred, and concentrations of less than about 30 ppm sulfur and less than about 100 ppm nitrogen are most preferred. It has been discovered that, even at catalyst concentrations as low as 0.25 ppm, full cure of the elastomer can be achieved if the concentration of sulfur and nitrogen is within the most preferred ranges.

Most paraffinic petroleum oils for the rubber industry are derived from a crude oil distillation stream. A typical refining history would include some type of dewaxing to reduce the pour point, a solvent extraction to physically remove aromatic compounds and a hydrotreating process to chemically modify aromatic structures. Both extraction and hydrotreating result in a net increase in the total concentration of saturated hydrocarbon structures and a net decrease in the total aromatic, sulfur and nitrogen-containing compound concentration. The degree of reduction in concentration of these compounds in the oil is dependent upon the type and severity of the refining employed, and the nature of the crude oil. White and paraffinic oils have been treated more extensively than aromatic and napthenic oils and would contain a smaller concentration of aromatic, sulfur and/or nitrogen compounds. It is difficult to elucidate the exact chemical structure of these compounds due to their complexity. The tendency of an oil to interfere with platinum catalyzed hydrosilylation is directly related to the concentration of sulfur and nitrogen containing compounds, as well as compounds which contain phosphorus, tin, arsenic, aluminum and iron.

Processing

The rubber component of the thermoplastic vulcanizate is generally present as small, i.e. micro-size, particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as roll mills. Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "fully cured" or "fully crosslinked" as used in the specification and claims means that the rubber component to be vulcanized has been cured or crosslinked to a state in which the elastomeric properties of the crosslinked rubber are similar to those of the rubber in its conventional vulcanized state, apart from the thermoplastic elastomer composition. The degree of cure can be described in terms of gel content, or conversely, extractable components. Gel content reported as percent gel (based on the weight of crosslinkable rubber) is determined by a procedure which comprises determining the amount of insoluble polymer by soaking the specimen for 48 hours in organic solvent at room temperature, weighing the dried residue and making suitable corrections based upon knowledge of the composition. Thus, corrected initial and final weights are obtained by subtracting from the initial weight the weight of soluble components, other than rubber to be vulcanized, such as extender oils, plasticizers and components of the composition soluble in organic solvent, as well as that rubber component of the product which is not intended to be cured. Any insoluble polyolefins, pigments, fillers, and the like are subtracted from both the initial and final weights. The rubber component can be described as fully cured when less than about 5%, and preferably less than 3%, of the rubber which is capable of being cured by hydrosilylation is extractable from the thermoplastic elastomer product by a solvent for that rubber. Alternatively the degree of cure may be expressed in terms of crosslink density. All of these descriptions are well known in the art, for example in U.S. Pat. Nos. 4,593,062, 5,100,947 and 5,157,081, all of which are fully incorporated herein by this reference.

The following general procedure was used in the preparation of thermoplastic elastomers by the process of the invention, as set forth in the examples. The thermoplastic resin and oil extended rubber were placed in a heated internal mixer, with the hydrosilylation agent and hydrosilylation catalyst. The hydrosilylation agent and catalyst can be incorporated into the composition by the suitable technique, for example by injection as solutions in oil or as neat components, although a dilute catalyst solution is preferred. Additives such as antioxidants, ultraviolet stabilizers and fillers may also be added as a slurry in oil. Masterbatches of the components may also be prepared to facilitate the blending process. The mixture was heated to a temperature sufficient to melt the thermoplastic component, and the mixture was masticated with added processing oil if desired, until a maximum of mixing torque indicated that vulcanization has occurred. Mixing was continued until the desired degree of vulcanization was achieved.

The invention will be better understood by reference to the following examples which serve to illustrate but not limit the present process. In the examples, the following test methods were used to determine the properties of the thermoplastic elastomer products.

Hardness (Shore A)-ASTMD2240
Ultimate tensile strength (UTS-psi)-ASTMD412
Ultimate elongation (UE-%)-ASTMD412
Modulus at 100% clogation (M1-psi)-ASTMD412
Tension set (TS-%)-ASTMD412
Oil swell (OS-%)-ASTMD471

(IRM 903 oil at 125° C. For 24 hours) The rubber component used in the compositions prepared according to the examples are further identified as follows (composition expressed as weight percent). The remaining monomer is propylene.

| RUBBER | Ethylene | VNB | Mooney (MST) | Catalyst |
| --- | --- | --- | --- | --- |
| A | 62.7 | 0.1 | 73.9 | $VOCl_3$ |
| B | 57.4 | 1.2 | 20.2 | $VCl_4$ |
| C | 60.2 | 1.3 | 23.0 | $VOCl_3$ |
| D | 55.6 | 0.9 | 46.9 | $VOCl_3$ |
| E | 62.4 | 0.5 | 85.8 | $VOCl_3$ |
| F | 62.6 | 0.7 | 78.3 | $VOCl_3$ |
| G | 64.0 | 1.1 | 79.9 | $VOCl_3$ |
| H | 63.5 | 1.4 | 82.6 | $VCl_4$ |
| I | 65.2 | 4.0 | 64.2 | $VOCl_3$ |

-continued

| RUBBER | Ethylene | VNB | Mooney (MST) | Catalyst |
|---|---|---|---|---|
| J | 57.6 | 0.4 | 69.1 | $VOCl_3$ |
| K | 61.0 | 1.2 | 52.9 | $VOCl_3$ |
| L | 59.7 | 1.3 | 60.4 | $VCl_4$ |
| M | 58.4 | 2.4 | 55.0 | $VOCl_3$ |

EXAMPLES

Compositions were prepared as generally described above using polypropylene resin and EPDM rubber containing vinyl norbornene as a diene monomer. A masterbatch composition was prepared containing 100 parts rubber, 100 parts paraffinic extender oil, 42 parts clay (Icecap K) and 41 parts polypropylene. This blend was mixed in a Brabender mixer at 180° C. until the polypropylene was melted. Silicone hydride (3 phr) was added dropwise to the mix, followed by addition of an oil solution containing platinum catalyst at various levels. The rubber was dynamically vulcanized by mixing the blend until maximum torque was reached. Additional processing oil was added after the cure. The product was removed from the mixer, then returned to the mixer and masticated at 180° C. for an additional minute. Test specimens were prepared by compression molding the products at 200° C. and physical properties were determined. The results are set forth in the following table.

TABLE

| Example | Rubber | Catalyst (ppm Pt) | Hardness (A) | UTS (psi) | Elongation (%) | M1 (psi) | TS (%) | OS (%) |
|---|---|---|---|---|---|---|---|---|
| 1 | A | 0.25 | 53 | 584 | 692 | 231 | 11.5 | 327 |
|   |   | 0.35 | 54 | 672 | 696 | 245 | 10 | 300 |
|   |   | 0.5 | 56 | 704 | 616 | 279 | 9.5 | 239 |
|   |   | 1 | 58 | 769 | 568 | 316 | 9.5 | 196 |
| 2 | B | 0.25 | 44 | 341 | 183 | 247 | 13.5 | 201 |
|   |   | 0.35 | 47 | 432 | 195 | 291 | 12 | 175 |
|   |   | 0.5 | 47 | 391 | 200 | 248 | 11.5 | 171 |
|   |   | 1 | 55 | 634 | 215 | 346 | 9 | 128 |
| 3 | C | 0.25 | 50 | 480 | 225 | 292 | 10.5 | 179 |
|   |   | 0.35 | 51 | 535 | 188 | 350 | 10 | 159 |
|   |   | 0.5 | 53 | 619 | 227 | 342 | 8.5 | 136 |
|   |   | 1 | 57 | 730 | 220 | 382 | 8 | 111 |
| 4 | D | 0.25 | 50 | 380 | 219 | 289 | 14.5 | 227 |
|   |   | 0.35 | 53 | 584 | 286 | 312 | 10.5 | 188 |
|   |   | 0.5 | 54 | 640 | 294 | 313 | 9.5 | 151 |
|   |   | 1 | 58 | 747 | 257 | 381 | 8.5 | 126 |
| 5 | E | 0.25 | 60 | 950 | 400 | 390 | 8 | 105 |
|   |   | 0.35 | 61 | 940 | 430 | 370 | 7 | 103 |
|   |   | 0.5 | 61 | 960 | 350 | 450 | 6 | 92 |
|   |   | 1 | 60 | 950 | 340 | 440 | 6 | 94 |
| 6 | F | 0.25 | 62 | 950 | 390 | 400 | 8 | 102 |
|   |   | 0.35 | 61 | 920 | 340 | 400 | 7 | 94 |
|   |   | 0.5 | 60 | 900 | 320 | 420 | 6 | 93 |
|   |   | 1 | 62 | 880 | 290 | 410 | 6 | 94 |
| 7 | G | 0.25 | 56 | 860 | 400 | 460 | 9 | 119 |
|   |   | 0.5 | 56 | 970 | 330 | 440 | 8 | 92 |
|   |   | 1 | 63 | 920 | 270 | 450 | 6.5 | 85 |
| 8 | H | 0.25 | 58 | 722 | 255 | 409 | 9.5 | 133 |
|   |   | 0.35 | 60 | 830 | 259 | 463 | 7.5 | 118 |
|   |   | 0.5 | 60 | 779 | 236 | 436 | 7.5 | 108 |
|   |   | 1 | 63 | 854 | 207 | 503 | 7 | 91 |
| 9 | I | 0.25 | 53 | 634 | 406 | 318 | 10.5 | 185 |
|   |   | 0.35 | 56 | 729 | 390 | 352 | 9 | 165 |
|   |   | 0.5 | 58 | 773 | 321 | 394 | 8.5 | 123 |
|   |   | 1 | 60 | 802 | 241 | 435 | 8 | 101 |
| 10 | J | 0.25 | 57 | 860 | 400 | 430 | 7 | 110 |
|   |   | 0.35 | 58 | 850 | 280 | 430 | 7 | 97 |
|   |   | 1 | 59 | 780 | 210 | 450 | 5 | 93 |
| 11 | K | 0.25 | 55 | 658 | 342 | 317 | 10 | 159 |
|   |   | 0.35 | 57 | 847 | 393 | 328 | 9.5 | 127 |
|   |   | 0.5 | 59 | 893 | 346 | 398 | 7.5 | 108 |
|   |   | 1 | 61 | 973 | 267 | 467 | 6.5 | 92 |
| 12 | L | 0.25 | 52 | 495 | 236 | 287 | 9.5 | 164 |
|   |   | 0.35 | 53 | 595 | 254 | 320 | 9.5 | 164 |
|   |   | 0.5 | 56 | 621 | 241 | 330 | 8.5 | 137 |
|   |   | 1 | 58 | 797 | 237 | 407 | 8 | 111 |
| 13 | M | 0.25 | 53 | 532 | 305 | 291 | 10.5 | 162 |
|   |   | 0.35 | 54 | 659 | 297 | 348 | 9.5 | 145 |
|   |   | 0.5 | 56 | 693 | 282 | 365 | 8.5 | 129 |
|   |   | 1 | 60 | 802 | 253 | 410 | 7.5 | 104 |

Examples 1–4 are outside the scope of the invention. In these examples either the Mooney viscosity (MST) was below the critical level (Examples 2–4) or the diene content of the elastomeric polymer was below the critical level (Example 1). In these four examples the physical properties of the thermoplastic elastomer were inferior to the physical properties of compositions within the scope of the invention. The tensile strength of the products was low and the oil swell was high, indicative of a low degree of crosslinking of the rubber component. In contrast, examples within the scope of the invention (Examples 5–13) demonstrate that use of a rubber component containing about 0.3 weight percent or more of vinyl norbornene and having a Mooney viscosity in the MST range of from about 45 to about 100 produces a thermoplastic elastomer product which has an unexpectedly improved combination of physical properties. This improvement is achieved even at extremely low concentrations of hydrosilylation catalyst.

While the best mode and preferred embodiment of the invention have been set forth in accord with the Patent Statutes, the scope of the invention is not limited thereto, but rather is defined by the attached claims.

What is claimed is:

1. In a process for the dynamic vulcanization of an unsaturated rubber in a blend with a thermoplastic resin in the presence of a hydrosilylation agent and hydrosilylation catalyst, the improvement which comprises employing as said rubber an ethylene, α-olefin, non-conjugated diene elastomeric polymer, wherein said elastomeric polymer contains from about 40 to about 90 weight percent ethylene and about 0.25 weight percent or more of vinyl norbornene, with a Mooney viscosity in the MST range of from about 45 to about 100.

2. The process of claim 1 wherein said elastomeric polymer has a branching index of from about 0.1 to about 1.0.

3. The process of claim 1 wherein said elastomeric polymer contains from about 50 to about 75 weight percent ethylene and from about 0.5 to about 1.2 weight percent vinyl norbornene.

4. The process of claim 1 wherein said elastomeric polymer has a Mooney viscosity in the MST range of from about 50 to about 85 and a branching index of from about 0.5 to about 1.0.

5. The process of claim 1 wherein the thermoplastic resin is polypropylene and the unsaturated rubber is EPDM rubber.

6. The process of claim 1 wherein the unsaturated rubber is fully crosslinked by dynamic vulcanization.

7. The process of claim 1 wherein the dynamic vulcanization is carried out in the presence of processing or extender oil which is substantially free of materials having the chemical behavior of a Lewis base.

8. A thermoplastic elastomer prepared by the process of claim 1.

9. In a thermoplastic elastomer composition comprising a blend of thermoplastic resin and an unsaturated rubber which has been crosslinked by dynamic vulcanization using a hydrosilylation agent and hydrosilylation catalyst, the improvement comprising said rubber being an ethylene, α-olefin, non-conjugated diene elastomeric polymer, wherein said elastomeric polymer contains from about 40 to about 90 weight percent ethylene and from about 0.25 weight percent or more of vinyl norbornene, with a Mooney viscosity in MST range of from about 45 to about 100.

10. The composition of claim 9 wherein said elastomeric polymer has a branching index of from about 0.1 to about 1.0.

11. The composition of claim 9 wherein said elastomeric polymer contains from about 50 to about 75 weight percent ethylene and from about 0.5 to about 1.2 weight percent vinyl norbornene.

12. The composition of claim 9 wherein said elastomeric polymer has a Mooney viscosity in the MST range of from about 50 to about 85 and a branching index of from about 0.5 to about 1.0.

13. The composition of claim 9 wherein the thermoplastic resin is polypropylene and the unsaturated rubber is EPDM rubber.

14. The composition of claim 9 wherein the unsaturated rubber is fully crosslinked by dynamic vulcanization.

15. The composition of claim 9 wherein the dynamic vulcanization is carried out in the presence of processing or extender oil which is substantially free of materials having the chemical behavior of a Lewis base.

* * * * *